Patented Dec. 27, 1932                                            1,892,366

UNITED STATES PATENT OFFICE

MASANORI SATO AND CHIYOMATSU ITO, OF DAIREN, CHINA, ASSIGNORS TO MINAMI MANSHU TETSUDO KABUSHIKI KAISHA, OF DAIREN, MANCHURIA, CHINA

METHOD OF EXTRACTING FATTY OIL

No Drawing. Application filed June 20, 1929, Serial No. 372,310, and in Japan September 6, 1928.

This invention relates to a method of extracting fatty oil from soya bean, characterized by the fact that alcohol is added as a solvent to the raw material, the mixture being heated under pressure to a temperature above the boiling point and below 120° C. and then the extracted liquor is cooled below 50° C. so that oil may be separated from alcohol without the necessity of distilling. The object thereof is to economize the quantity of alcohol used and effect the extraction of fatty oil in a short time by increasing the dissolving power of alcohol for fatty oil.

Now, it has hitherto been generally considered very difficult to dissolve bean oil and the other fatty oils perfectly in alcohol and therefore the latter is ordinarily deemed unsuitable as a solvent. We have discovered after considerable research that the dissolving power of alcohol for fatty oil increases rapidly at a temperature above the boiling point and we have utilized it in this way for extracting fatty oil. That is to say, the alcohol is added to the raw material such as soya beans, and the mixture is maintained under pressure and fatty oil is extracted therefrom at a temperature above the boiling point and below 120° C. the extracted liquor is simply cooled so as to separate the oil from the alcohol. Thus, a considerable economy in the quantity of alcohol used is effected and fatty oil is extracted very rapidly and perfectly.

The following are examples of the manner in which the invention may be practiced:

1. Ethyl alcohol (96%) is added to soya beans and the mixture heated under pressure in an autoclave to a temperature of about 85° C. thereby to extract oil from the beans. The extracted liquor is then cooled to a temperature below 30° C., whereupon the oil alone will separate out, whereas coloring matter, sugar, lecithin and other impurities will remain in the alcohol, so that colorless bean oil of superior quality is obtained. Moreover, as distillation is unnecessary, the cost of fuel and other expenses are saved.

2. Ethyl alcohol (93%) is added to dried soya beans and the mixture heated under pressure to a temperature of about 105° C. thereby extracting oil from the beans. The extracted liquor is then cooled as in the foregoing example, and bean oil of superior quality is obtained.

We claim:

The method of extracting fatty oil from soya beans, which consists in adding alcohol as a solvent to said beans, heating the mixture under pressure to a temperature above the boiling point of the alcohol at ordinary atmospheric pressure and below 120° C. thereby to extract oil from said beans, and cooling the extracted liquor to a temperature below 50° C. thereby to separate the oil from the alcohol.

In testimony whereof we have affixed our signatures.

MASANORI SATO.
CHIYOMATSU ITO.